United States Patent
Inomata et al.

(10) Patent No.: US 6,623,875 B2
(45) Date of Patent: Sep. 23, 2003

(54) MAGNETIC RECORDING MEDIUM AND MAGNETIC STORAGE APPARATUS

(75) Inventors: Akihiro Inomata, Kawasaki (JP); E. Noel Abarra, Kawasaki (JP); B. Ramamurthy Acharya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/901,380

(22) Filed: Jul. 9, 2001

(65) Prior Publication Data
US 2002/0071966 A1 Jun. 13, 2002

(30) Foreign Application Priority Data
Dec. 7, 2000 (JP) ........................................ 2000-373375

(51) Int. Cl.$^7$ .............................. G11B 5/66; G11B 5/70; H01F 1/00; B32B 15/00
(52) U.S. Cl. ............................. 428/694 TM; 428/212; 428/336; 428/611; 428/667; 428/694 TS; 428/900
(58) Field of Search ................... 428/694 TM, 212, 428/336, 900, 611, 667, 694 TS

(56) References Cited

U.S. PATENT DOCUMENTS

| | | | |
|---|---|---|---|
| 5,693,426 A | 12/1997 | Lee et al. | 418/611 |
| 5,701,223 A | 12/1997 | Fontana, Jr. et al. | 360/113 |
| 5,851,643 A | 12/1998 | Honda et al. | 428/212 |
| 6,143,388 A | 11/2000 | Bian et al. | 428/65.3 |
| 6,280,813 B1 * | 8/2001 | Carey et al. | 428/65.3 |

OTHER PUBLICATIONS

Okamoto, et al., Rigid Disk Medium for 5 Gb/in$^2$ Recording, AB–3, Intermag '96 Digest, IEEE, 1996.
Hoscoe et al., Experimental Study of Thermal Decay in High–Density Magnetic Recording Media, IEEE Trans. Magn. vol. 33, 1528 (1997).
Lu et al., Thermal Instability at 10 Gbit/in$^2$ Magnetic Recording, IEEE Transactions on Magnetics, vol. 30, No. 6, Nov. 1994.
Abarra et al., Thermal Stability of Narrow Track Bits in a 5 Gbit/in$^2$ Medium, IEEE Trans. Mag. vol. 33, 2995 (1997).
He, et al., High–Speed Switching in Magnetic Recording Media, Journal of Magnetism and Magnetic Materials, vol. 155, (1996).
Akimoto, et al., Relationship Between Magnetic Circumferential Orientation and Magnetic Thermal Stability, Journal of Magnetism and Magnetic Materials, (1999), in press.
Abarra, et al., The Effects of Orientation Ratio on the Dynamic Coercivity of Media for >15 Gbit/in$^2$ Recording, EB–02, Intermag '99, Korea.
Richter, et al., Dynamic Coercivity Effects in Thin Film Media, IEEE Trans. Magn. vol. 34, 1540 (1997).
Lu, et al., Magnetic Viscosity in High–Density Recording, J. Appl. Phys., vol. 75, 5768 (1994).
Lu, et al., High Density Magnetic Recording Media Design and Identification Susceptibility to Thermal Decay, IEEE Transactions on Magnetics, vol. 31, No. 6, Nov. 1995.
Parkin, Systematic Variation of the Strength and Oscillation Period of Indirect Magnetic Exchange Coupling through the 3d, 4d and 5d Transition Metals, Phys. Rev. Lett., vol. 67, 3598 (1991).
Kawato, et al.,, Spin Valve Films with Synthetic Ferrimagnets (Co/Ru/Co) for Pinned Layers, (Source and year unknown).

* cited by examiner

Primary Examiner—Holly Rickman
(74) Attorney, Agent, or Firm—Greer, Burns & Crain Ltd.

(57) ABSTRACT

A magnetic recording medium includes at least one magnetic layer, a ferromagnetic layer, a nonmagnetic coupling layer provided between the magnetic layer and the ferromagnetic layer, and a coupling intensifying region which intensifies an exchange coupling strength between the magnetic layer and the ferromagnetic layer. The coupling intensifying region is provided at, at least one of a boundary between the ferromagnetic layer and the nonmagnetic coupling layer and a boundary between the nonmagnetic coupling layer and the magnetic layer.

11 Claims, 9 Drawing Sheets

MAGNETIC RECORDING MEDIUM AND MAGNETIC STORAGE APPARATUS

BACKGROUND OF THE INVENTION

This application claims the benefit of a Japanese Patent Application No. 2000-373375 filed Dec. 7, 2000, in the Japanese Patent Office, the disclosure of which is hereby incorporated by reference.

1. Field of the Invention

The present invention generally relates to magnetic recording media and magnetic storage apparatuses, and more particularly to a magnetic recording medium and a magnetic storage apparatus which are suited for high-density recording.

Due to developments made in the information processing technology, there are increased demands to further increase the recording density of magnetic recording media. Of the characteristics which are required by the magnetic recording medium to satisfy such demands, the medium noise needs to be reduced and the thermal stability needs to be improved in the case of a hard disk.

2. Description of the Related Art

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording", AB-3, Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol.33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the transition width between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol.30, 4230 (1994) demonstrated, by micromagnetic simulation, that exchange-decoupled grains having a diameter of 10 nm and ratio $K_u V/k_B T \sim 60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in$^2$ Medium", IEEE Trans. Magn. Vol.33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol.155, 6 (1996), for magnetic tape media, and in J. H. Richter, "Dynamic Coercivity Effects in Thin Film Media", IEEE Trans. Magn. Vol.34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. vol.193, pp.240–242 (1999), report through micromagnetic simulation, that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", IEEE Trans. Magn. vol.35, pp.2709–2711, 1999.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

In order to overcome the problems described above, a magnetic recording medium was proposed in a U.S. patent application Ser. No. 09/425,788 filed Oct. 22, 1999, the disclosure of which is hereby incorporated by reference. This proposed magnetic recording medium includes at least one exchange layer structure, and a magnetic layer formed on the exchange layer structure, where the exchange layer structure includes a ferromagnetic layer and a nonmagnetic coupling layer provided on the ferromagnetic layer and under the magnetic layer, so that magnetization directions of the magnetic layer and the ferromagnetic layer are antiparallel. This proposed magnetic recording medium can improve the thermal stability of written bits and reduce the medium noise, so as to enable a reliable high-density recording without degrading the overwrite performance.

In addition, when two magnetic layers have mutually different thicknesses and have antiparallel magnetization directions in this proposed magnetic recording medium, portions of the magnetizations of the two magnetic layers cancel each other. As a result, an effective grain size of the magnetic layers can be increased substantially without affecting the resolution. Accordingly, it is possible to realize a magnetic recording medium having improved thermal stability.

In other words, this proposed magnetic recording medium employs a basic structure for improving the thermal stability of written bits, and for reducing the medium noise. When an external recording magnetic field is applied to this proposed magnetic recording medium, the magnetization directions of the magnetic layer and the ferromagnetic layer become parallel or closer to parallel, and the magnetization direction of the ferromagnetic layer is inverted when the recording magnetic field is thereafter reduced to zero (residual magnetization state) and becomes antiparallel to the magnetization direction of the magnetic layer. Therefore, it is important to invert the magnetization direction of the ferromagnetic layer to increase the total thickness of the magnetic layers and to realize a magnetic recording medium having an improved thermal stability.

In order to further improve the functions of this proposed magnetic recording medium, it is desirable that the exchange-coupling field for making the magnetization directions of the magnetic layer and the ferromagnetic layer antiparallel is generated with a sufficient intensity.

On the other hand, when mass production of the magnetic recording media is taken into consideration, it is desirable to quickly and positively judge, in a simple manner, that the exchange coupling is positively realized. However, no method has been proposed which would enable such a quick and positive judgement to be made in a simple manner with respect to the exchange coupling which is realized.

SUMMARY OF THE INVENTION

Accordingly, it is a general object of the present invention to provide a novel and useful magnetic recording medium and magnetic storage apparatus, in which the problems described above are eliminated and the desired exchange-coupling field is generated.

Another and more specific object of the present invention is to provide a magnetic recording medium and a magnetic storage apparatus, which can further improve the thermal stability of written bits and realize a reliable high-density recording.

Another and more specific object of the present invention is to provide a magnetic recording medium and magnetic storage apparatus, which can quickly and positively judge, in a simple manner, whether or not an exchange coupling is positively realized.

Still another object of the present invention is to provide a magnetic recording medium comprising at least one magnetic layer, a ferromagnetic layer, a nonmagnetic coupling layer provided between the magnetic layer and the ferromagnetic layer, and a coupling intensifying region which intensifies an exchange coupling strength between the magnetic layer and the ferromagnetic layer, where the coupling intensifying region is provided at, at least one of a boundary between the nonmagnetic layer and the magnetic layers. According to the magnetic recording medium of the present invention, it is possible to intensify the exchange coupling field within the magnetic recording medium and further improve the thermal stability. In addition, it is possible to quickly and positively judge, in a simple manner, whether or not an exchange coupling is positively realized, thereby making the magnetic recording medium suited for mass production.

A further object of the present invention is to provide a magnetic storage apparatus comprising at least one magnetic recording medium including at least one magnetic layer, a ferromagnetic layer, a nonmagnetic coupling layer provided between the magnetic layer and the ferromagnetic layer, and a coupling intensifying region which intensifies an exchange coupling strength between the magnetic layer and the ferromagnetic layer, where the coupling intensifying region is provided at, at least one of a boundary between the nonmagnetic layer and the magnetic layers. According to the magnetic storage apparatus of the present invention, it is possible to improve the thermal stability of written bits, reduce the medium noise, and carry out a high-density recording having a high reliability without adversely affecting the performance of the magnetic recording medium. In addition, it is possible to quickly and positively judge, in a simple manner, whether or not an exchange coupling is positively realized, thereby making the magnetic recording medium and thus the magnetic storage apparatus suited for mass production.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention.

The present invention submits the use of layers with antiparallel magnetization structures. For example, the magnetizations can be made parallel or antiparallel by using a particular thickness of Ru or Ir layer between two ferromagnetic layers. In the case of S. S. P. Parkin, "Systematic Variation of the Strength and Oscillation Period of Indirect Magnetic Exchange Coupling through the 3d, 4d, and 5d Transition Metals", Phys. Rev. Lett. Vol.67, 3598 (1991), several magnetic transition metals such as Co, Fe and Ni that are coupled through thin nonmagnetic interlayers such as Ru and Rh are described. In another case, a U.S. Pat. No. 5,701,223 proposes a spin-valve which employs the above described layers as laminated pinning layers to stabilize the sensor.

By using a structure made up of two ferromagnetic layers of different thicknesses with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another exchange layer structure described above which has a ferromagnetic layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization or, by a laminated ferrimagnetic structure. The ferromagnetic layer or the laminated ferrimagnetic structure is made up of exchange-decoupled grains as the magnetic layer.

In order to further improve the thermal stability of the magnetic recording medium previously proposed in the U.S. patent application Ser. No. 09/425,788 referred above, the present invention promotes an increase of the exchange coupling strength between the magnetic layer and the ferromagnetic layer of the magnetic recording medium.

Figure 1:
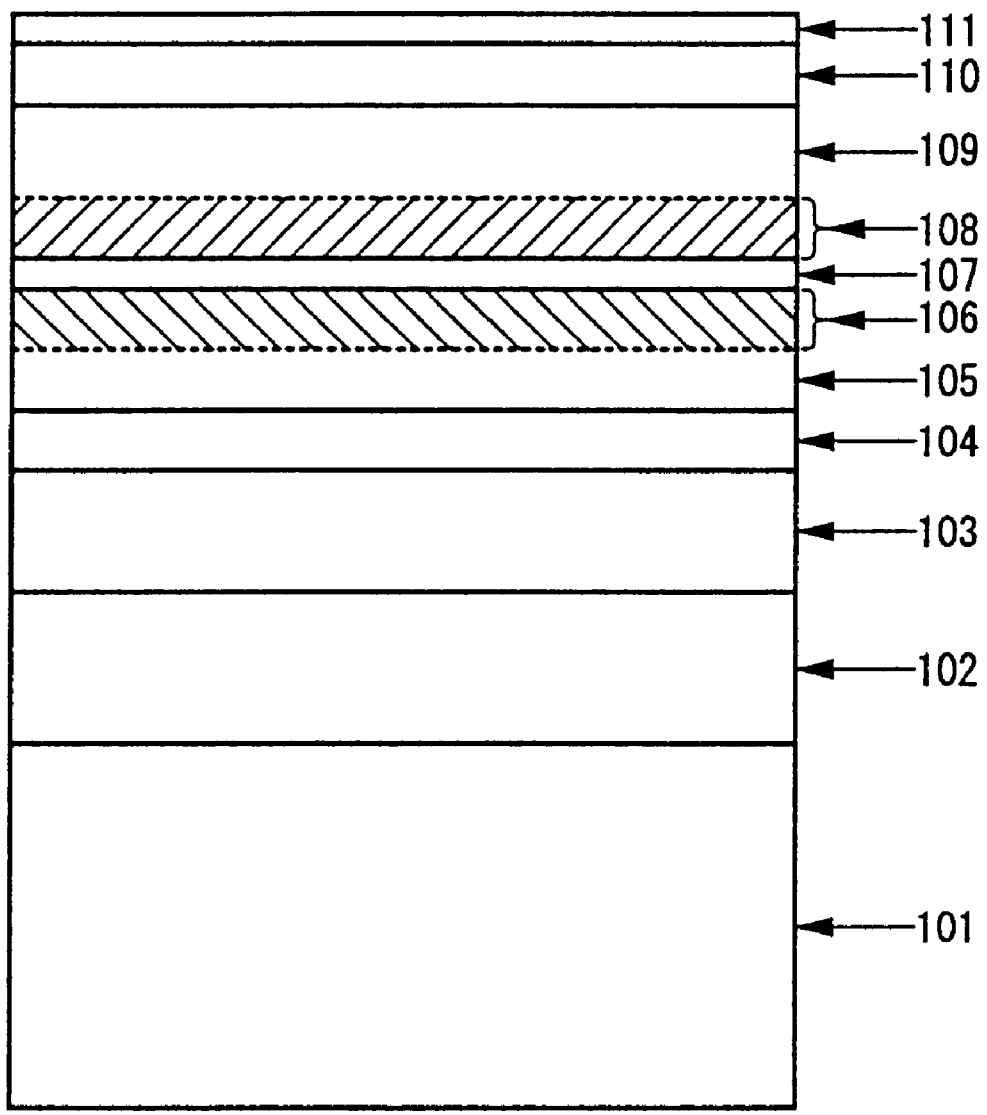
FIG. 1 is a cross sectional view showing an important part of an embodiment of a magnetic recording medium according to the present invention.

FIG. 1 is a cross sectional view showing an important part of an embodiment of the magnetic recording medium according to the present invention.

The magnetic recording medium shown in FIG. 1 has a basic structure including a nonmagnetic substrate 101, a seed layer 102, an underlayer 103, a nonmagnetic intermediate layer 104, a ferromagnetic layer 105, a nonmagnetic coupling layer 107, a magnetic layer 109, a protection layer 110, and a lubricant layer 111 which are laminated in this order.

For example, the nonmagnetic substrate 101 is made of Al, Al alloy or glass. The nonmagnetic substrate 101 may or may not be mechanically textured.

The seed layer 102 is made of NiP, for example, especially in a case where the nonmagnetic substrate 101 is made of Al or Al alloy. The NiP seed layer 102 is may or may not be mechanically textured, and may or may not be oxidized. In addition, the seed layer 102 may be made of a B2 structure alloy such as NiAl and FeAl, in a case where the nonmagnetic substrate 101 is made of glass, for example. The seed layer 102 is provided to promote a (001) or a (112) texture of the underlayer 103 which is formed on the seed layer 102.

In a case where the magnetic recording medium is a magnetic disk, the mechanical texturing provided on the nonmagnetic substrate 101 or the NiP seed layer 102 is made in a circumferential direction of the disk, that is, in a direction in which tracks of the magnetic disk extend.

The nonmagnetic intermediate layer 104 is provided to further promote epitaxy of the magnetic layer 109, narrow the grain size distribution of the magnetic layer 109, and orient the anisotropy axes (axes of easy magnetization) of the magnetic layer 109 along a plane parallel to the recording surface of the magnetic recording medium. The nonmagnetic intermediate layer 104 is made of a hcp structure alloy such as CoCr-M, where M=B, Mo, Nb, Ta, W, Cu or alloys thereof, and has a thickness in a range of 1 to 5 nm.

The ferromagnetic layer 105 is made of Co, Ni, Fe, Co-based alloy, Ni-based alloy, Fe-based alloy or the like. In other words, alloys such as CoCrTa, CoCrPt and CoCrPt-M, where M=B, Mo, Nb, Ta, W, Cu or alloys thereof may be used for the ferromagnetic layer 105. The ferromagnetic layer 105 has a thickness in a range of 2 to 10 nm.

The nonmagnetic coupling layer 107 is made of Ru, Re, Os, Rh, Ir, Cr, Cu, Ru-based alloy, Re-based alloy, Os-based alloy, Rh-based alloy, Ir-based alloy, Cr-based alloy, Cu-based alloy or the like. The nonmagnetic coupling layer 107 has a thickness in a range of 0.4 to 1.0 nm, and preferably on the order of approximately 0.8 nm, when made of Ru, Re or Os. For this particular thickness range of the nonmagnetic coupling layer 107, the magnetizations of the ferromagnetic layer 105 and the magnetic layer 109 are antiparallel. The ferromagnetic layer 105 and the nonmagnetic coupling layer 107 form an exchange layer structure described above. The exchange layer structure may be formed in a plurality of stages.

The magnetic layer 109 is made of Co or a Co-based alloy such as CoCrTa, CoCrPt and CoCrPt-M, where M=B, Mo, Nb, Ta, W, Cu or alloys thereof. The magnetic layer 109 has a thickness in a range of 5 to 30 nm, for example. Of course, the magnetic layer 109 is not limited to a single-layer structure, and a multi-layer structure may be used for the magnetic layer 109.

The protection layer 110 is made of C, for example. In addition, the lubricant layer 111 is made of an organic lubricant, for example, for use with a magnetic transducer such as a spin-valve head. The protection layer 110 and the lubricant layer 111 form a protection layer structure on the recording surface of the magnetic recording medium.

Obviously, the layer structure under the exchange layer structure is not limited to that shown in FIG. 1. For example, the underlayer 103 may be made of Cr or Cr-based alloy and formed on to a thickness in a range of 5 to 40 nm on the nonmagnetic substrate 101, and the exchange layer structure may be provided on this underlayer 103.

In this embodiment of the magnetic recording medium shown in FIG. 1, at least one of upper and lower coupling intensifying regions 108 and 106 is provided in addition to the basic structure described above. The lower coupling intensifying region 106 is provided at a boundary of the ferromagnetic layer 105 and the nonmagnetic coupling layer 107. The lower coupling intensifying region 106 has a magnetization direction parallel to the ferromagnetic layer 105. The upper coupling intensifying region 108 is provided at a boundary of the magnetic layer 109 and the nonmagnetic coupling layer 107. The upper coupling intensifying region 108 has a magnetization direction parallel to the magnetic layer 109.

The upper coupling intensifying region 108 cooperates with the magnetic layer 109, and the lower coupling intensifying region 106 cooperates with the ferromagnetic layer 105, so as to intensify the exchange coupling between the magnetic layer 109 and the ferromagnetic layer 105 to thereby further improve the thermal stability. The exchange coupling strength between the ferromagnetic layer 105 and the magnetic layer 109 is intensified and improved, even when only one of the upper and lower coupling intensifying regions 108 and 106 is provided.

It is important that coupling intensifying regions 106 and 108 exist at, at least one of the boundaries between the nonmagnetic coupling layer 107 and the magnetic layers 105 and 109. The upper coupling intensifying region 108 may be formed as a part of the surface of the nonmagnetic coupling layer 107 or the magnetic layer 109 or, formed as an interface formed on the surface of the nonmagnetic coupling layer 107 or the magnetic layer 109 or, formed on the surface of the nonmagnetic coupling layer 107 or the magnetic layer 109 to a recognizable thickness. Similarly, the lower coupling intensifying region 106 may be formed as a part of the surface of ferromagnetic layer 105 or the nonmagnetic coupling layer 107 or, formed as an interface formed on the surface of the ferromagnetic layer 105 or the nonmagnetic coupling layer 107 or, formed on the surface of the ferromagnetic layer 105 or the nonmagnetic coupling layer 107 to a recognizable thickness.

For example, the upper and lower coupling intensifying regions 108 and 106 are made of a material selected from a group of Fe, Co, Ni and alloys thereof. Preferably, the upper and lower coupling intensifying regions 108 and 106 are made of Co, CoCr, CoCrTa or the like. It is also possible to use a material such as Co-X, CoCr-Y or CoCrTa-Y for the upper and lower coupling intensifying regions 108 and 106, where X=Pt, Pd, Ta, B, Cu, W, Mo, Nb, Ru, Re, Rh, Ir, or alloys thereof, and Y=Pt, Pd, B, Cu, W, Mo, Nb, Ru, Re, Rh, Ir or alloys thereof.

Preferably, a maximum thickness of each of the upper and lower coupling intensifying regions 108 and 106 is limited to approximately 2 nm. Furthermore, each of the upper and lower coupling intensifying regions 108 and 106 may be formed in a surface state or a distributed state. For example, the lower coupling intensifying region 106 sufficiently functions to intensify the exchange coupling, even if a desired material of the lower coupling intensifying region 106 may be formed in a distributed granular state on or as a part of the surface of the ferromagnetic layer 105. Hence, even in a state where a small amount of the desired material of the upper or lower coupling intensifying region 108 or 106 is formed in the distributed granular state, the small amount of the distributed desired material can sufficiently function as the coupling intensifying region.

Therefore, the thickness of the desired material within the coupling intensifying region is approximately 2.0 nm or less. The characteristics of the magnetic recording medium differ depending on the desired material used for the coupling intensifying region. For this reason, it is preferable to select the thickness of the desired material forming each of the upper and lower coupling intensifying regions 108 and 106 by taking into account such characteristics required of the magnetic recording medium, as will be described later.

In addition, the coupling intensifying regions 106 and 108 can be formed at only one of the boundaries between the nonmagnetic coupling layer 107 and the magnetic layers 105 and 109. When both the coupling intensifying regions 106 and 108 are formed, the material, composition and thickness of one of the coupling intensifying regions 106 and 108 may be different from those of the other.

In some cases, the materials such as Fe, Co, Ni and alloys thereof which are suitable for use as the upper and lower coupling intensifying regions 108 and 106 may also be used for the ferromagnetic layer 105 and the magnetic layer 109. Accordingly, the material used for the ferromagnetic layer 105 and the material used for the lower coupling intensifying region 106 may have the same composition of similar compositions, but it is desirable that the material used for the lower coupling intensifying region 106 has a larger content of Co or the like, that is, richer in Co or the like, compared to the ferromagnetic layer 105. Similarly, the material used for the magnetic layer 109 and the material used for the upper coupling intensifying region 108 may have the same composition of similar compositions, but it is desirable that the material used for the upper coupling intensifying region 108 has a larger content of Co or the like, that is, richer in Co or the like, compared to the magnetic layer 109. For example, it is desirable that the content of Co or the like in the upper and lower coupling intensifying regions 108 and 106 is 10 to 20 at % higher than that of a Co-including material which is generally used for a magnetic layer. Therefore, even in a case where the materials used for the ferromagnetic layer 105 and the magnetic layer 109 are similar to the materials used for the upper and lower coupling intensifying regions 108 and 106, the material used for the upper and lower coupling intensifying regions 108 and 106 are richer in Co or the like.

On the other hand, a material which is rich in Co or the like may be used for the ferromagnetic layer 105. In this case, the lower coupling intensifying region 106 is included in the ferromagnetic layer 105, and the surface of the ferromagnetic layer 105, that is, the interface between the ferromagnetic layer 105 and the nonmagnetic coupling layer 107, substantially becomes the lower coupling intensifying region 106. As a result, it becomes unnecessary to independently prepare a material for forming the lower coupling intensifying region 106. Similarly, a material which is rich in Co or the like may be used for the magnetic layer 109. In this case, the upper coupling intensifying region 108 is included in the magnetic layer 109, and the surface of the magnetic layer 109, that is, the interface between the magnetic layer 109 and the nonmagnetic coupling layer 107, substantially becomes the upper coupling intensifying region 108. Consequently, it becomes unnecessary to independently prepare a material for forming the upper coupling intensifying region 108.

In other words, the lower coupling intensifying region 106 simply needs to substantially exist at the boundary between the ferromagnetic layer 105 and the nonmagnetic coupling layer 107, and the upper coupling intensifying region 108 simply needs to substantially exist at the boundary between the nonmagnetic coupling layer 107 and the magnetic layer 109.

Each layer of this embodiment of the magnetic recording medium may be formed by a known thin film forming technology. For example, the magnetic recording medium shown in FIG. 1 may be produced by sequentially sputtering and laminating suitable materials on the nonmagnetic substrate 101.

When employing a laminating process to produce the magnetic recording medium, the lower coupling intensifying region 106 is formed on top of the ferromagnetic layer 105. A description will now be given of a case where the lower coupling intensifying region 106 is formed as an extremely thin film, by using different materials for the ferromagnetic layer 105 and the lower coupling intensifying region 106.

When the lower coupling intensifying region 106 is formed to an extremely thin film by forming Co to a thickness of 0.5 nm or less, for example, the Co may not be formed in a surface state on the top surface of the ferromagnetic layer 105, but may be formed in a distributed granular state where Co is distributed. Even if the nonmagnetic coupling layer 107 is formed on the Co in the distributed granular state, the lower coupling intensifying region 106 is at least formed at the boundary of the ferromagnetic layer 105 and the nonmagnetic coupling layer 107. The Co forming the lower coupling intensifying region 106 may assume a state embedded in the surface of the ferromagnetic layer 105 or the nonmagnetic coupling layer 107, and in such a case, it may be regarded that the lower coupling intensifying region 106 is formed at the interface of, or as a part of the surface of, the ferromagnetic layer 105 or the nonmagnetic coupling layer 107.

Such a relationship of the lower coupling intensifying region 106, the ferromagnetic layer 105 and the nonmagnetic coupling layer 107 also exists with respect to the upper coupling intensifying region 108, the nonmagnetic coupling layer 107 and the magnetic layer 109.

Next, a description will be given of the materials used for the upper and lower coupling intensifying regions 108 and 106 and a thickness t thereof in this embodiment, by referring to FIGS. 2 through 5.

In FIGS. 2 through 5, it is assumed for the sake of convenience that both the upper and lower coupling intensifying regions 108 and 106 are formed in an approximately uniform manner, and that values are measured for the magnetic recording media by simultaneously changing the thickness t (nm) of each of the upper and lower coupling intensifying regions 108 and 106. Three kinds of materials, namely, Co, CoCr and CoCrTa, were used for the upper and lower coupling intensifying regions 108 and 106, and the materials CoCr and CoCrTa were formed in the Co-rich state.

Figure 2:
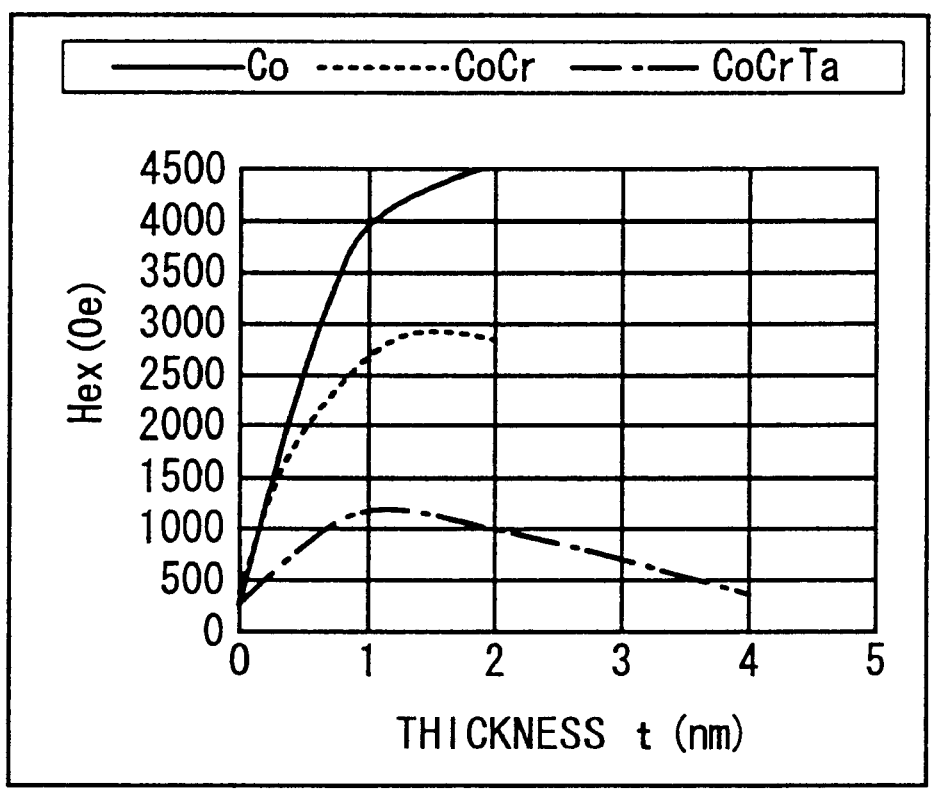
FIG. 2 is a diagram showing an exchange-coupling field of the magnetic recording medium when a thickness of a material forming both coupling intensifying regions is changed.

FIG. 2 is a diagram showing an exchange coupling field Hex of the magnetic recording medium when the thickness t of the material forming both the upper and lower coupling intensifying regions 108 and 106 is changed. In FIG. 2, the abscissa indicates the thickness t (nm) of the material forming both the upper and lower coupling intensifying regions 108 and 106, and the ordinate indicates the exchange coupling field Hex (Oe) which is generated by the exchange coupling realized by the provision of the ferromagnetic layer 105, the lower coupling intensifying region 106, the magnetic layer 109 and the upper coupling intensifying region 108. In addition, a solid line indicates a case where the material used for both the upper and lower coupling intensifying regions 108 and 106 is Co, a dotted line indicates a case where the material used is CoCr, and a one-dot chain line indicates a case where the material used is CoCrTa.

For all of the three kinds of materials used for the upper and lower coupling intensifying regions 108 and 106, the exchange coupling field Hex tends to increase up to the thickness t of t=1 nm, and it was confirmed that the exchange coupling field Hex is further intensified to a higher level of approximately 2500 Oe for CoCr, and approximately 4000 Oe for Co. The exchange coupling field Hex increased for Co and CoCr even when the thickness t exceeds 1 nm, but it was found that the exchange coupling field Hex decreases for both Co and CoCr when the thickness t exceeds 2 nm. The intensification of the exchange coupling field Hex for CoCrTa is smaller compared to those for Co and CoCr.

However, the exchange coupling field Hex for CoCrTa can be set to a practical level when the thickness t is set to approximately 1 nm.

Therefore, it is possible to design a magnetic recording medium having a desired exchange coupling field Hex by appropriately selecting the material and the thickness t of each of the upper and lower coupling intensifying regions 108 and 106. It is obvious that a richer Co content results in a higher exchange coupling field Hex. Moreover, it was found that a notable exchange coupling field intensifying effect can be obtained even when the thickness t of the material used for each of the upper and lower coupling intensifying regions 108 and 106 is less than 1 nm, such as 0.5 nm or less, for example. It was also found desirable that the maximum thickness t of the material is approximately 2 nm or less. Hence, according to this embodiment, it is possible to intensify the exchange coupling field Hex virtually without increasing the total thickness of the magnetic recording medium.

In addition, when the exchange coupling field Hex can be increased as described above, it is possible to increase the coercivity of the magnetic recording medium. When the coercivity of the magnetic recording medium can be increased, it is possible to design a magnetic recording medium suited for high-density recording while improving the thermal stability.

Figure 3:
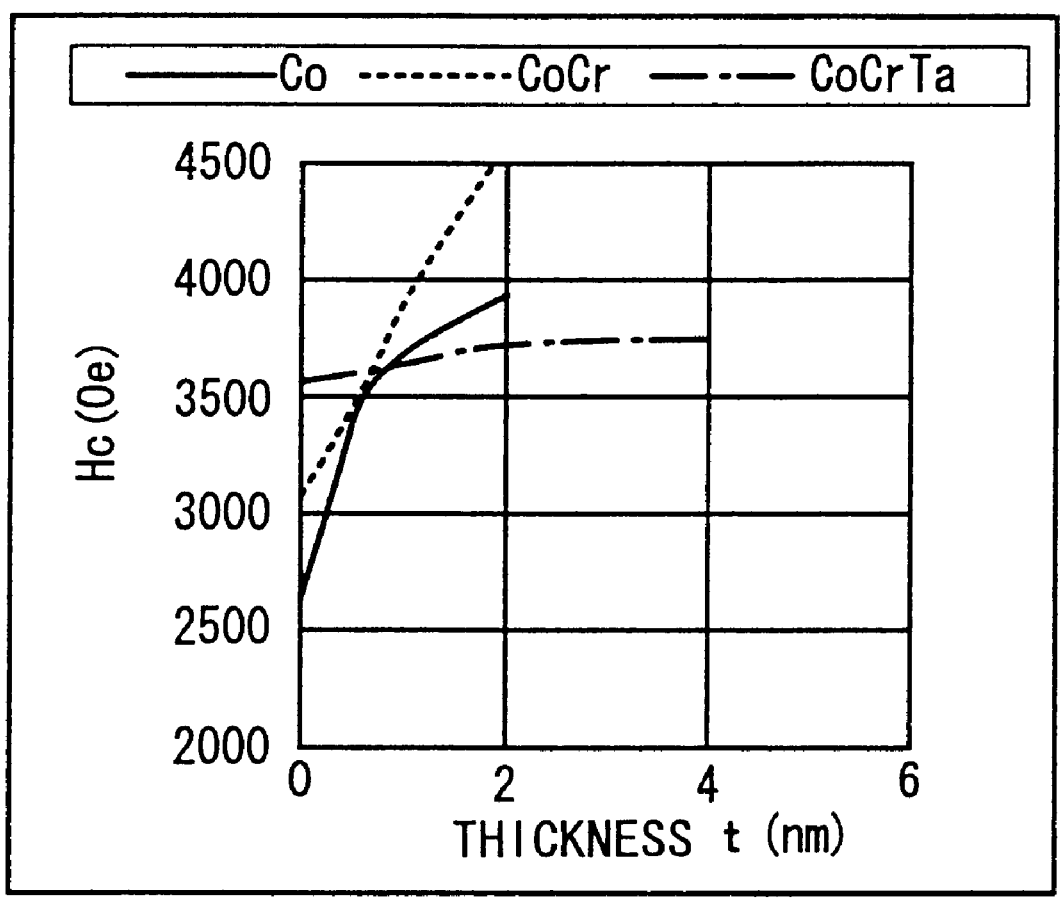
FIG. 3 is a diagram showing a coercivity of the magnetic recording medium when the thickness of the material forming both the coupling intensifying regions is changed.

FIG. 3 is a diagram showing a coercivity Hc of the magnetic recording medium when the thickness t of the material forming both the upper and lower coupling intensifying regions 108 and 106 is changed. In FIG. 3, the abscissa indicates the thickness t (nm) of the material forming both the upper and lower coupling intensifying regions 108 and 106, and the ordinate indicates the coercivity Hc of the magnetic recording medium. In addition, a solid line indicates a case where the material used for both the upper and lower coupling intensifying regions 108 and 106 is Co, a dotted line indicates a case where the material used is CoCr, and a one-dot chain line indicates a case where the material used is CoCrTa.

It was confirmed from FIG. 3 that the coercivity Hc can be controlled by increasing the thickness t of the material used for both the upper and lower coupling intensifying regions 108 and 106.

In other words, the coercivity Hc of the magnetic recording medium can be controlled by simply adjusting the thickness t of the material used for both the upper and lower coupling intensifying regions 108 and 106, without changing the magnetic material used for the magnetic recording medium. Because the thermal stability can be improved regardless of the magnetic material used for the magnetic recording medium, it becomes possible to select the magnetic material which is suited for reducing the medium noise.

Figure 4:
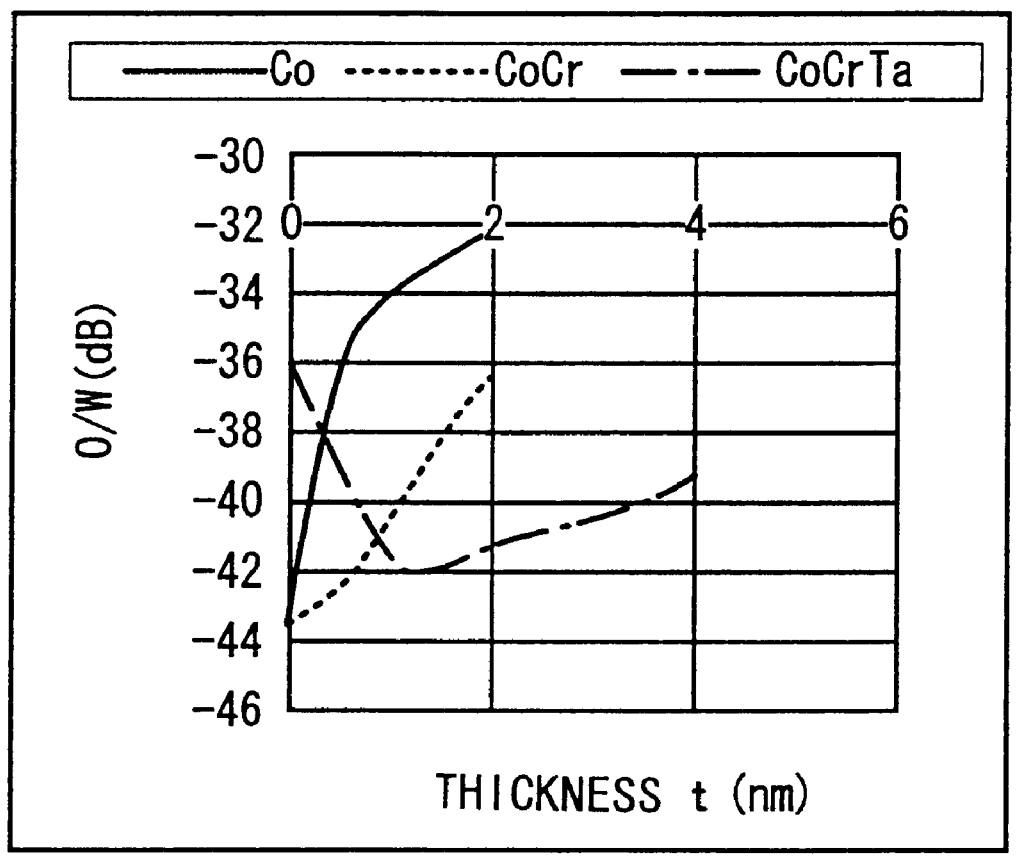
FIG. 4 is a diagram showing an overwrite performance of the magnetic recording medium when the thickness of the material forming both the coupling intensifying regions is changed.

FIG. 4 is a diagram showing an overwrite performance (O/W) of the magnetic recording medium when the thickness t of the material forming both the upper and lower coupling intensifying regions 108 and 106 is changed. In FIG. 4, the abscissa indicates the thickness t (nm) of the material forming both the upper and lower coupling intensifying regions 108 and 106, and the ordinate indicates the overwrite performance (O/W) (dB) of the magnetic recording medium. In addition, a solid line indicates a case where the material used for both the upper and lower coupling intensifying regions 108 and 106 is Co, a dotted line indicates a case where the material used is CoCr, and a one-dot chain line indicates a case where the material used is CoCrTa.

The overwrite performance was obtained by making a first magnetic recording on the magnetic recording medium, and then making a second magnetic recording on the magnetic recording medium at a different frequency. Thereafter, the recordings on the magnetic recording medium were reproduced, so as to measure the residual first recording on the magnetic recording medium, that is, the overwrite performance value (dB). It is desirable that the overwrite performance value is low.

It was found from FIG. 4 that the overwrite performance tends to deteriorate when the thickness t of the material used for both the upper and lower coupling intensifying regions 108 and 106 is increased, for cases where Co or CoCr is used for both the upper and lower coupling intensifying regions 108 and 106. In addition, the deterioration of the overwrite performance was considerably small when an element such as Cr is added to the Co.

On the other hand, it was found from FIG. 4 that the overwrite performance tends to improve when CoCrTa is used for both the upper and lower coupling intensifying regions 108 and 106. Hence, it was confirmed that CoCrTa is desirable for use as the upper and lower coupling intensifying regions 108 and 106. Particularly in the case of CoCrTa, the overwrite performance improves as the thickness t increases towards t=1 nm, and an extremely satisfactory overwrite performance was obtained even when the thickness t is t=2 nm. Accordingly, it was found that the upper and lower coupling intensifying regions 108 and 106 are desirably made of CoCrTa when producing a magnetic recording medium by focusing on an improved overwrite performance. It was also found that the upper and lower coupling intensifying regions 108 and 106 can be formed to improve the overwrite performance when an element such as Ta is added to the CoCr-based alloy.

Figure 5:
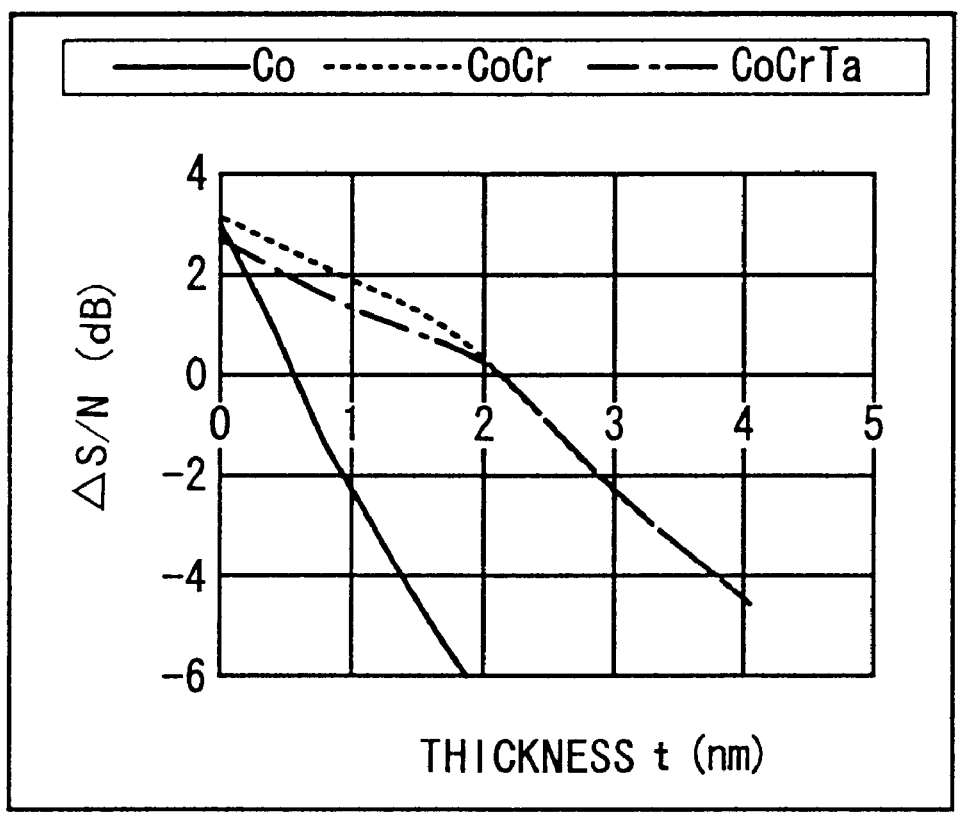
FIG. 5 is a diagram showing a recording characteristic of the magnetic recording medium when the thickness of the material forming both the coupling intensifying regions is changed.

FIG. 5 is a diagram showing a recording characteristic ΔS/N of the magnetic recording medium when the thickness t of the material forming both the upper and lower coupling intensifying regions 108 and 106 is changed. The recording characteristic ΔS/N indicates a deviation of a signal-to-noise (S/N) ratio of the magnetic recording medium with reference to a reference or S/N ratio of a reference magnetic recording medium. In FIG. 5, the abscissa indicates the thickness t (nm) of the material forming both the upper and lower coupling intensifying regions 108 and 106, and the ordinate indicates the recording characteristic ΔS/N (dB) of the magnetic recording medium. Of course, it is desirable that the S/N ratio is high and the recording characteristic ΔS/N is high to the positive side. In addition, a solid line indicates a case where the material used for both the upper and lower coupling intensifying regions 108 and 106 is Co, a dotted line indicates a case where the material used is CoCr, and a one-dot chain line indicates a case where the material used is CoCrTa.

It was found from FIG. 5 that the recording characteristic tends to deteriorate with increasing thickness t, for all of the three kinds of materials used for the upper and lower coupling intensifying regions 108 and 106. However, when the thickness t of the three kinds of materials is 1 nm or less, the recording characteristic is 1 dB or greater, which is within a range that may be sufficiently compensated by a known compensation technique. Even though the recording characteristic deteriorates, it was found that the effect of improving the thermal stability is much greater by providing the upper and lower coupling intensifying regions 108 and 106.

The materials used for both the upper and lower coupling intensifying regions 108 and 106, that is, Co alloys, have a high proportion of Co to Cr compared to the ferromagnetic layer 105 and the magnetic layer 109. This may promote positive exchange coupling between grains in the layer where the Co alloys are directly in contact with each other, to thereby increase medium noise Nm of the magnetic recording medium, especially when the upper and lower coupling intensifying regions 108 and 106 are formed in a surface state.

Increasing the Cr content of the upper and lower coupling intensifying regions 108 and 106 reduces the medium noise Nm, but degrades the exchange coupling field Hex between the ferromagnetic layer 105 and the magnetic layer 109. In order to maintain or increase the Co content of the grain core, a magnetic isolation process such as heating or annealing can be applied after deposition of the lower and upper coupling intensifying regions 106 and 108. Since the Cr concentration is higher in the magnetic layer 109 and the ferromagnetic layer 105, Cr atoms diffuse to the Cr-poor grain boundaries of the upper and lower coupling intensifying regions 108 and 106. Within the upper and lower coupling intensifying regions 108 and 106, Cr may also diffuse from the core towards the grain boundary. Such a process may be carried out in the following manner, for example.

In other words, the process may include the steps of depositing a seed layer 102, an underlayer 103, an intermediate layer 104, a ferromagnetic layer 105, a coupling intensifying region 106, a nonmagnetic coupling layer 107, a magnetic layer 109, a protection (C) layer 110, and the step of post-heating.

The post-heating step may be carried out immediately after the step of depositing the coupling intensifying region 106 or the nonmagnetic coupling layer 107.

If a coupling intensifying region 108 is also applied to the magnetic layer 109, the post-heating step may be carried out after the step of depositing the magnetic layer 109 or the protection layer 110, in the following manner, for example.

That is, the process may include the steps of depositing a seed layer 102, an underlayer 103, an intermediate layer 104, a ferromagnetic layer 105, a lower coupling intensifying region 106, a nonmagnetic coupling layer 107, an upper coupling intensifying region 108, a magnetic layer 109, a protection (C) layer 110, and the step of post-heating.

Therefore, by magnetically isolating the grains by carrying out such a magnetic isolation process, it becomes possible to reduce the medium noise Nm while improving the thermal stability of the magnetic recording medium.

As may be seen from FIGS. 2 through 5, the exchange coupling field Hex can be intensified, and the thermal stability can be improved, by providing the upper and lower coupling intensifying regions 108 and 106 within the magnetic recording medium. Furthermore, by appropriately selecting the material and thickness used for the upper and lower coupling intensifying regions 108 and 106, it is also possible to adjust the coercivity Hc and the overwrite performance (O/W), that is, the S/N ratio, of the magnetic recording medium.

Figure 6:
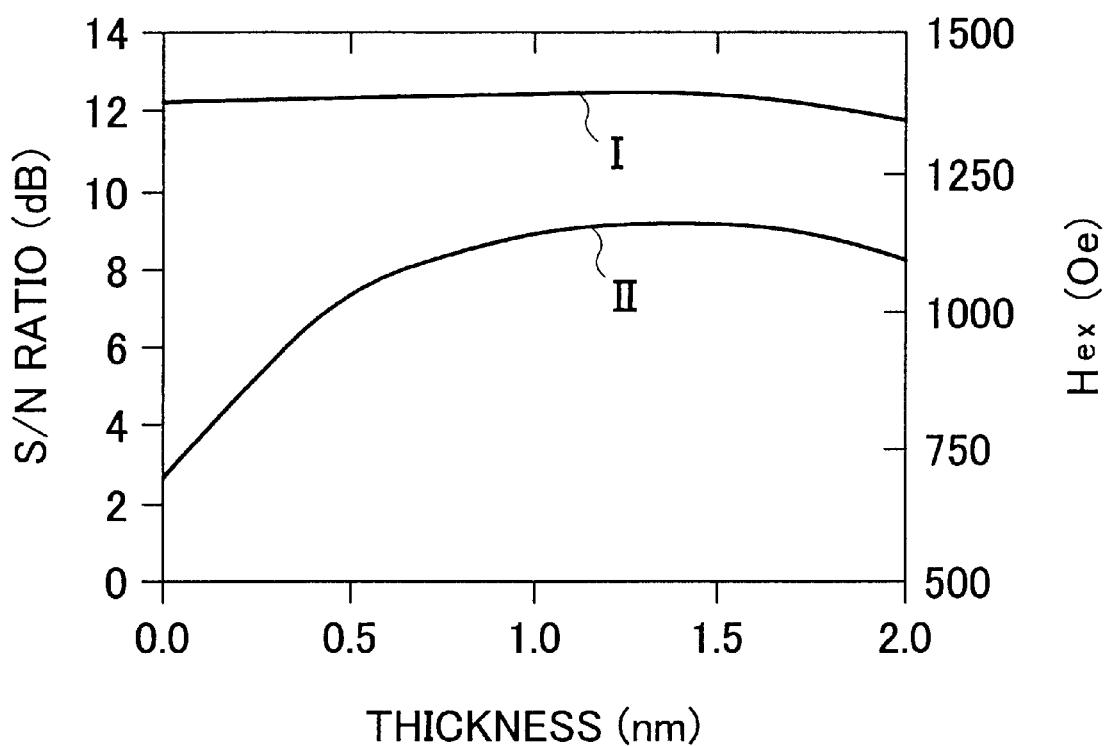
FIG. 6 is a diagram showing a S/N ratio and an exchange coupling field of the embodiment of the magnetic recording medium for a case where a thickness of a material forming a lower coupling intensifying region is changed.

Next, a description will be given of the effect of using only the lower coupling intensifying region 106 for various thicknesses thereof, by referring to FIG. 6. FIG. 6 is a diagram showing a S/N ratio and an exchange coupling field Hex of this embodiment of the magnetic recording medium for a case where a thickness t of a material forming the lower coupling intensifying region 106 is changed. CoCr in a Co-rich state was used as the material forming the lower coupling intensifying region 106.

In FIG. 6, the abscissa indicates the thickness t (nm) of the material forming the lower coupling intensifying region 106. The ordinate on the left indicates the S/N ratio (dB) of the magnetic recording medium, and the ordinate on the right indicates the exchange coupling field Hex (Oe) of the magnetic recording medium. Of course, it is desirable that the S/N ratio representing the recording characteristic is high.

It may be seen from FIG. 6 that the S/N ratio, that is, the recording characteristic, is slightly improved or remains approximately the same with increasing thickness t, as indicated by I. On the other hand, the exchange coupling field Hex increases with increasing thickness t, as indicated by II in FIG. 6. More particularly, it was confirmed that both the S/N ratio and the exchange coupling field Hex are improved for the thickness t of up to 1 nm. For the thickness t from 1 nm to 2 nm, the S/N ratio remains substantially unchanged, while the exchange coupling field Hex starts to decrease, but the exchange coupling field Hex is still within a range suited for practical use.

Therefore, it was confirmed that, by forming only the lower coupling intensifying region 106, the exchange coupling field Hex is enhanced, to thereby improve the thermal stability of the magnetic recording medium, while improving or maintaining the S/N ratio substantially the same.

Next, a description will be given of a magnetization curve obtained by this embodiment of the magnetic recording medium in comparison with a magnetization curve of a magnetic recording medium having no coupling intensifying region, by referring to FIGS. 7 and 8.

Figure 7:
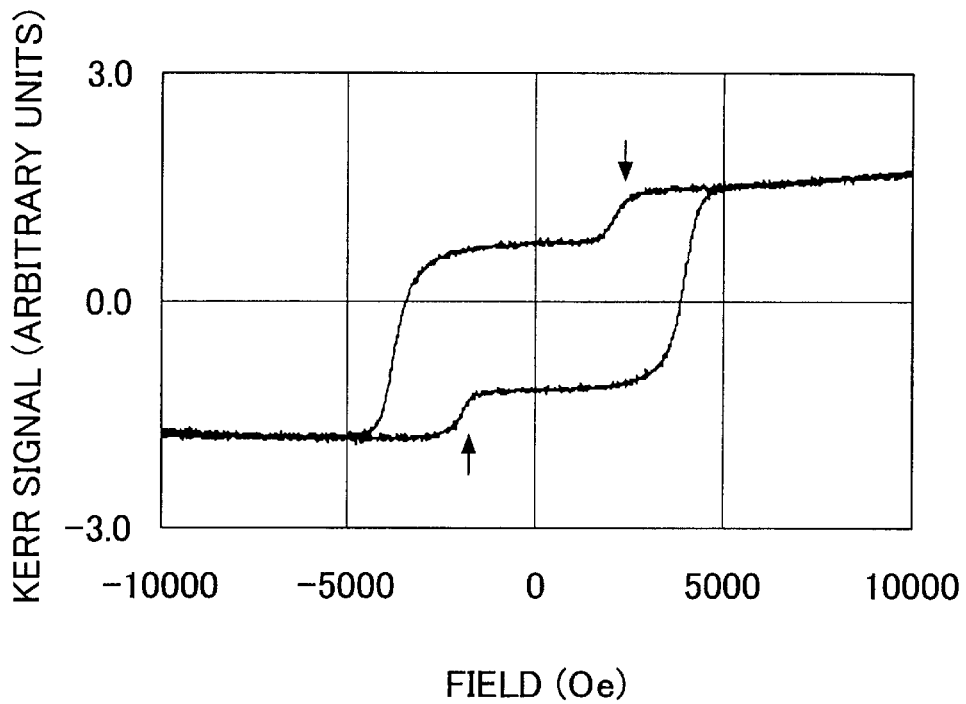
FIG. 7 is a diagram showing a relationship of a magnetic field and a Kerr signal for the embodiment of the magnetic recording medium having coupling intensifying regions.

FIG. 7 is a diagram showing a relationship of a magnetic field and a Kerr signal for this embodiment of the magnetic recording medium having the upper and lower coupling intensifying regions 108 and 106 made of Co-rich CoCr with a thickness of 1 nm. On the other hand, FIG. 8 is a diagram showing a relationship of a magnetic field and a Kerr signal for a magnetic recording medium which has no coupling intensifying region but otherwise has the same structure as this embodiment of the magnetic recording medium. In FIGS. 7 and 8, the ordinate indicates the Kerr signal (arbitrary units), that is, a signal output reproduced from the magnetic recording medium due to the Kerr effect, and the abscissa indicates the magnetic field (Oe).

Figure 8:
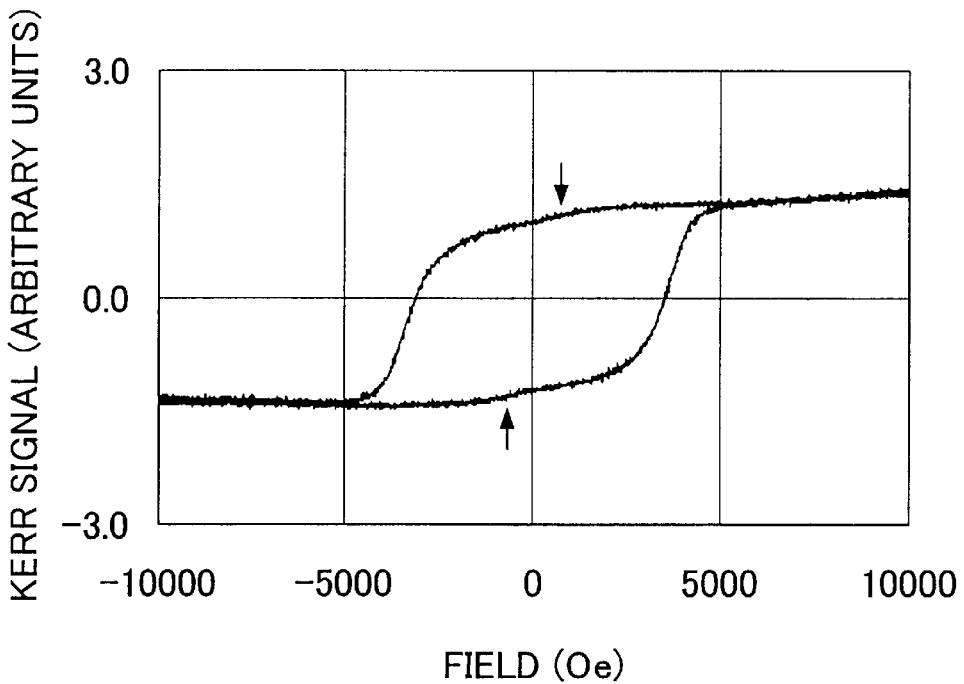
FIG. 8 is a diagram showing a relationship of a magnetic field and a Kerr signal for a magnetic recording medium which has no coupling intensifying region but otherwise has the same structure as the embodiment of the magnetic recording medium.

As may be seen from a comparison of FIGS. 7 and 8, it was confirmed that the exchange coupling field is intensified to approximately 2500 Oe as indicated by arrows in FIG. 7 by the provision of the upper and lower coupling intensifying regions 108 and 106, although such an intensified exchange coupling does not occur when no coupling intensifying region is provided as indicated by arrows in FIG. 8. Furthermore, it was confirmed that the exchange coupling state can be seen more clearly from FIG. 7 as compared to FIG. 8. Therefore, it was confirmed that the provision of the coupling intensifying regions 106 and 108 enables quick and positive judgement as to the exchange coupling state, by a simple manner, based on the magnetization curve of the magnetic recording medium. The simple, quick and positive judgement of the exchange coupling state is particularly desirable when mass production of the magnetic recording media is taken into consideration.

Figure 9:
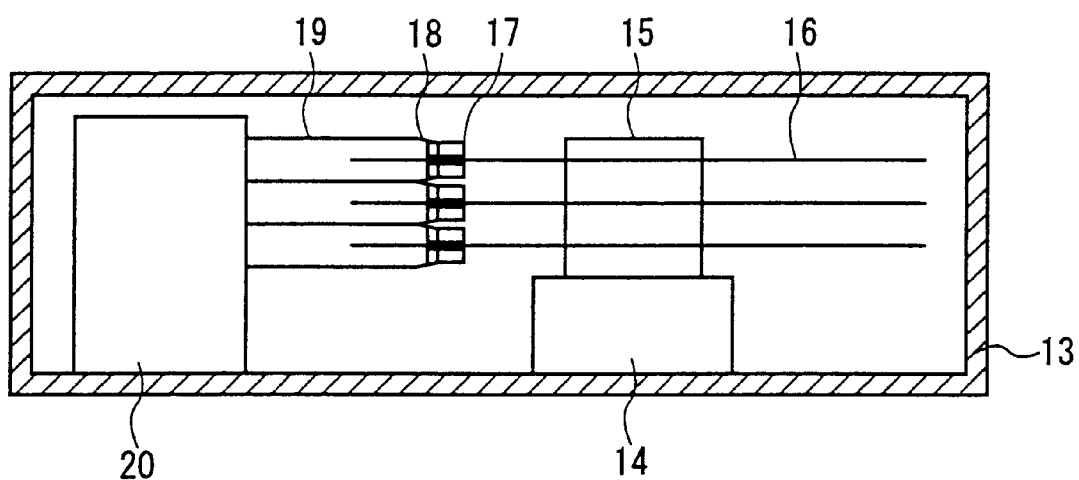
FIG. 9 is a cross sectional view showing an important part of an embodiment of a magnetic storage apparatus according to the present invention.

Next, a description will be given of an embodiment of a magnetic storage apparatus according to the present invention, by referring to FIGS. 9 and 10. FIG. 9 is a cross sectional view showing an important part of this embodiment of the magnetic storage apparatus, and FIG. 10 is a plan view showing the important part of this embodiment of the magnetic storage apparatus.

Figure 10:
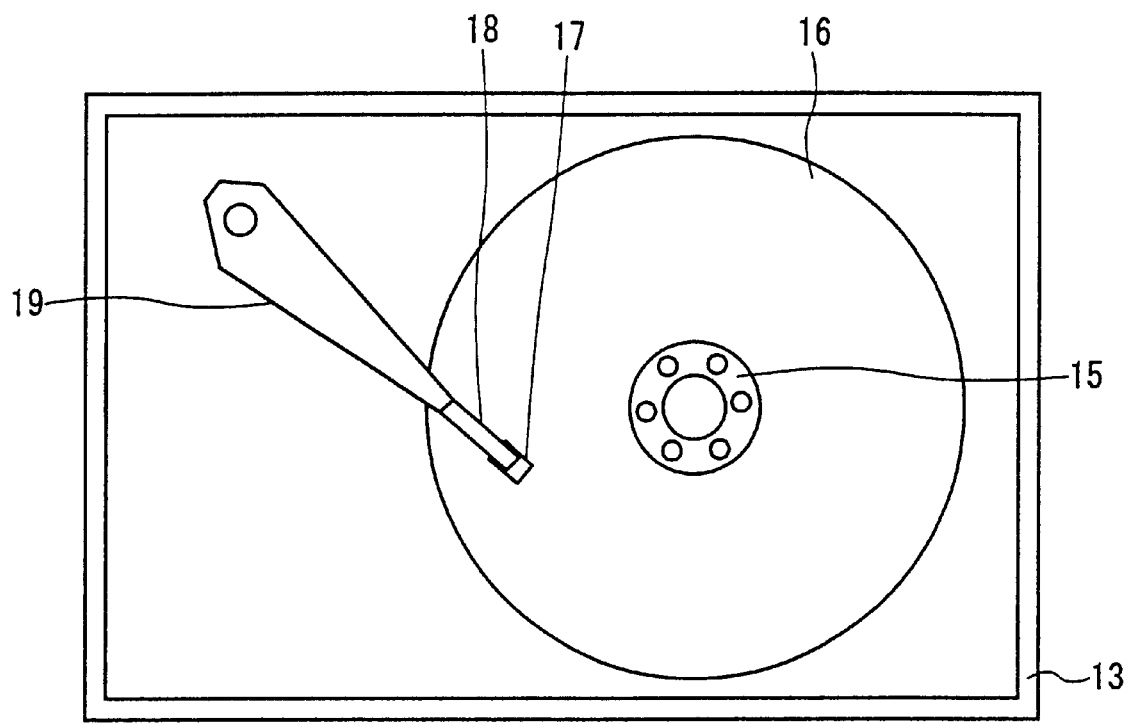
FIG. 10 is a plan view showing the important part of the embodiment of the magnetic storage apparatus.

As shown in FIGS. 9 and 10, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the embodiment of the magnetic recording medium described above in conjunction with FIG. 1. Of course, the number of magnetic recording media 16 is not limited to three, and only one, two or four or more magnetic recording media 16 may be provided.

The basic construction of the magnetic storage unit is not limited to that shown in FIGS. 9 and 10. In addition, the magnetic recording medium used in the present invention is not limited to a magnetic disk.

Further, the present invention is not limited to these embodiment, but various variations and modifications may be made without departing from the scope of the present invention.

What is claimed is:

1. A magnetic recording medium comprising:

at least one magnetic layer;

a ferromagnetic layer;

a nonmagnetic coupling layer provided between the magnetic layer and the ferromagnetic layer; and a coupling intensifying region which intensifies an exchange coupling strength between the magnetic layer and the ferromagnetic layer, said coupling intensifying region being provided at, at least one of a boundary between the ferromagnetic layer and the nonmagnetic coupling layer and a boundary between the nonmagnetic coupling layer and the magnetic layer, said coupling intensifying region being made of a material selected from a group consisting of CoCr, CoCrTa, Co-X, CoCr-Y and CoCrTa-Y, where X =Pt, Pd, Ta, B, Cu, W, Mo, Nb, Ru, Re, Rh, Ir or alloys thereof, and Y=Pt, Pd, B, Cu, W, Mo, Nb, Ru, Re, Rh, Ir or alloys thereof, wherein a content of Fe, Co or Ni in the material forming said coupling intensifying region is higher than a content in at least one of the ferromagnetic layer and the magnetic layer.

2. The magnetic recording medium as claimed in claim 1, wherein said coupling intensifying region is made of a material included in a surface of one of the ferromagnetic layer, the nonmagnetic coupling layer and the magnetic layer.

3. The magnetic recording medium as claimed in claim 1, wherein said coupling intensifying region has a maximum thickness of approximately 2 nm.

4. The magnetic recording medium as claimed in claim 1, wherein at least one of said ferromagnetic layer and said magnetic layer is made of a material identical to that forming said coupling intensifying region.

5. The magnetic recording medium as claimed in claim 1, wherein said coupling intensifying region is subjected to a grain isolation process.

6. The magnetic recording medium as claimed in claim 5, wherein said magnetic layer and said ferromagnetic layer have antiparallel magnetizations.

7. The magnetic recording medium as claimed in claim 1, wherein said magnetic layer and said ferromagnetic layer have antiparallel magnetizations.

8. The magnetic recording medium as claimed in claim 1, wherein said ferromagnetic layer and said nonmagnetic coupling layer, which is provided above said ferromagnetic layer and under said magnetic layer, form an exchange layer structure.

9. The magnetic recording medium as claimed in claim 1, wherein said nonmagnetic coupling layer is made of a material selected from a group consisting of Ru, Re, Os, Rh, Ir, Cr, Cu, Ru-based alloy, Re-based alloy, Os-based alloy, Rh-based alloy, Ir-based alloy, Cr-based alloy and Cu-based alloy.

10. The magnetic recording medium as claimed in claim 1, wherein said coupling intensifying region is made of a material having a distributed granular state.

11. A magnetic storage apparatus comprising:

at least one magnetic recording medium including at least one magnetic layer, a ferromagnetic layer, a nonmagnetic coupling layer provided between the magnetic layer and the ferromagnetic layer, and a coupling intensifying region which intensifies an exchange coupling strength between the magnetic layer and the ferromagnetic layer, said coupling intensifying region being provided at, at least one of a boundary between the ferromagnetic layer and the nonmagnetic coupling layer and a boundary between the nonmagnetic coupling layer and the magnetic layer, said coupling intensifying region being made of a material selected from a group consisting of CoCr, CoCrTa, Co-X, CoCr-Y, and CoCrTa-Y, where X=Pt, Pd, Ta, B, Cu, W, Mo, Nb, Ru, Re, Rh, Ir or alloys thereof, and Y=Pt, Pd, B, Cu, W, Mo, Nb, Ru, Re, Rh, Ir or alloys thereof, wherein a content of Fe, Co or Ni in the material forming said coupling intensifying region is higher than a content in at last one of the ferromagnetic layer and the magnetic layer.

\* \* \* \* \*